H. STANTON.
WAGON.
No. 4,984.
PATENTED FEB. 27, 1847.
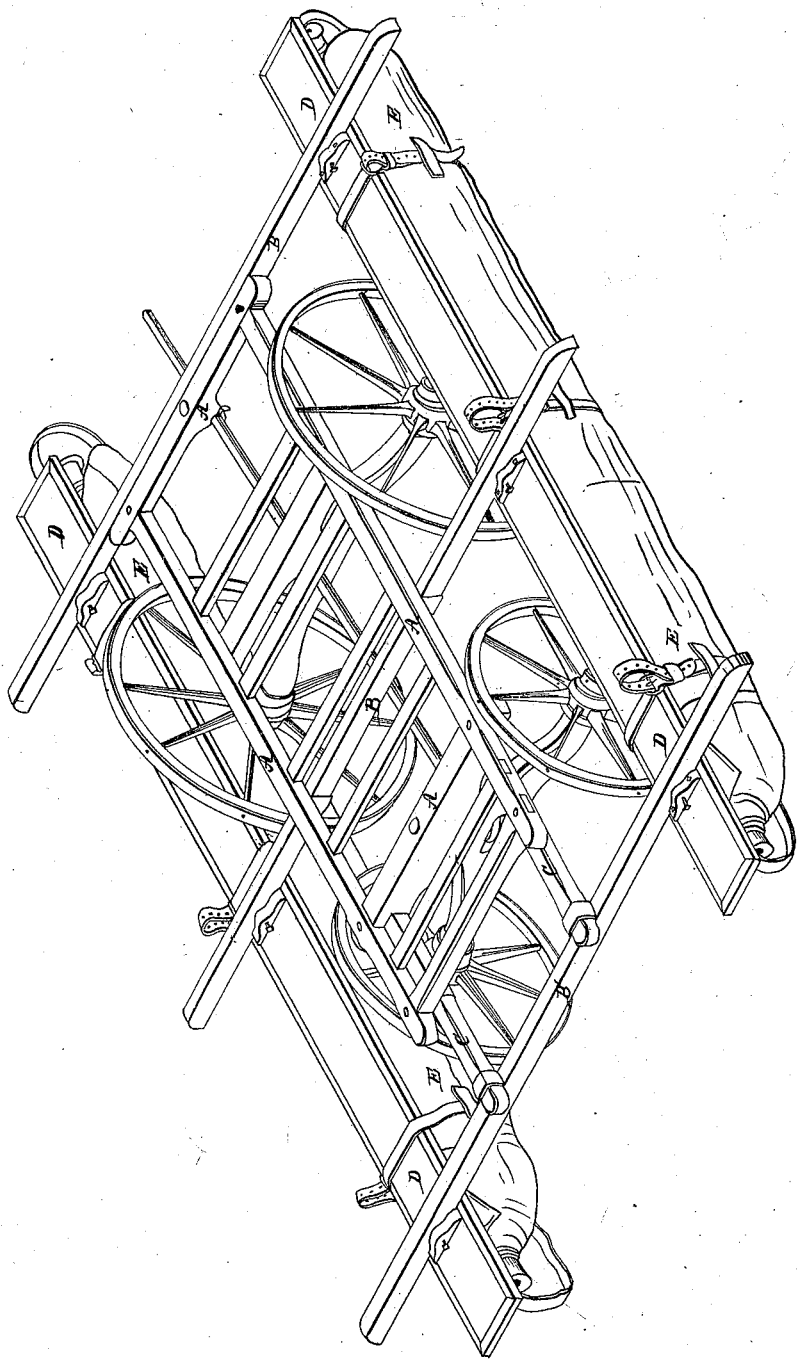

UNITED STATES PATENT OFFICE.

HENRY STANTON, OF WASHINGTON, DISTRICT OF COLUMBIA.

BUOYANT CARRIAGE, &c.

Specification of Letters Patent No. 4,984, dated February 27, 1847.

*To all whom it may concern:*

Be it known that I, HENRY STANTON, of the city of Washington, in the District of Columbia, have invented a new and useful Improvement in the Manner of Conveying Wagons and other Wheeled Vehicles with Their Loads Across Rivers and other Waters; and I do hereby declare that the following is a full and exact description thereof.

My improvement consists in the combining of floats, consisting of inflated air-tight bags of india rubber cloth, or other suitable material, with a wagon, or other wheeled vehicle, in such manner as that the vehicle may enter the water that is to be crossed, on its wheels, and pass forward thereon until it is sufficiently deep to immerse the air-tight floats in the water, which floats when sufficiently immersed will buoy up the vehicle and its load, and cause the whole to become a floating body. When a wagon, or other vehicle is to be conveyed across a river, or other water, there should be a rope, or ropes, attached by one end thereto, the other end being carried across the water in a boat, or otherwise, where by means of horses, or of men, the wagon may be drawn upon until the wheels strike the ground on the opposite shore, and it may then be drawn up on the land, by the horses attached thereto. By using a rope of sufficient length, the floats, and the apparatus for attaching them to the vehicle, may be drawn back through the water, and another wagon, or other vehicle be in like manner carried across; and so of any number in succession.

For the purpose of exemplifying the manner in which I combine the floats and wheeled vehicles, so as to adapt them to my purpose, I have, in the accompanying drawing, represented the frame work of a wagon, with the floats attached thereto, the body part of the wagon being omitted, for the purpose of showing the other parts more distinctly. It will be evident that with but slight modifications of the plan herein represented, any wheeled vehicle may be combined with the floats, and the desired end be thereby attained.

A, A, is the wagon frame, and B, B, B', are three, or any other preferred number, of cross bars, which, when a river, or other water, is to be crossed, are to be attached to the frame by screw bolts, or otherwise.

C, C, are temporary stanchions which do not make a part of the wagon frame, but are, when necessary, to be attached to its fore end for the purpose of receiving and sustaining the fore cross bar B'. To these cross bars, stout planks D, D, are attached by staples and wedges, or in any other convenient way, and to the under sides of these are secured, by straps, or otherwise, the air tight floats E, E, which before the vehicle enters the water are to be inflated by means of bellows, they being furnished with valves at one end formed in the ordinary way, for that purpose. When the load is very great there may be four floats similar to those marked E, the cross bars B, being made sufficiently long to sustain them. The capacity of the floats to sustain a given load is a matter of ready calculation, and I prefer the use of four floats to the doubling of the capacity of the two, as being most convenient and steady. One pair of floats, fourteen feet long, and eighteen inches in diameter, will displace about twenty four cubic feet of water, and will buoy up a weight of about thirty hundred pounds.

The facility with which the above described apparatus is prepared and managed, has been proved by experiments fairly made. One of the floats of the size designated was inflated in three minutes, and all the attachments were made, so as to render the wagon ready for floating in less than fifteen minutes; when four floats were used, two of them somewhat smaller than those above named, the attachment was completed by six men in twenty minutes, and the whole was disengaged in one minute. The rapidity with which these changes are made, result from its not being necessary to disturb the wagon wheels, and is dependent therefore on the combination of the floats, substantially in the manner described, with the wagon, or other wheeled carriage, while the wheels remain thereon. The aid of the wheels is also of primary importance in enabling the wagon and its load to pass into and out of the water, and over banks and shoals, the wheels either operating alone or in concurrence with the floats as the case may be.

Having thus fully described the nature of my improvement in the manner of transporting wagons and other wheeled vehicles, across rivers, and other waters, what I claim as new therein, and desire to secure by Letters Patent, is—

The combining of floats made of india rubber cloth, or of other material that is water tight, and capable of being inflated, with a wagon, or other wheeled vehicle, in the manner, and for the purpose herein set forth. I do not claim the use of such floats when attached to, or making a part of boats, or other vessels, or floating bodies, for the giving buoyancy thereto, or for their conveyance across, or along rivers, or other waters, this application of such floats being well known, but I limit my claim, as above stated, to their combination with wheeled vehicles, retaining their wheels; this being the essential feature of my improvement, and that upon which its whole novelty and utility are dependent, as it enables the wagon to pass into and out of the water, and also over shoals therein, in virtue of said combination of the floats and wheels.

HENRY STANTON

Witnesses:
WM. A. GORDON,
THOS. P. JONES.